United States Patent Office 3,454,392
Patented July 8, 1969

3,454,392
DIHALOPHENYL-p-NITROPHENYL ETHERS AS HERBICIDES
Kichiro Kato, Hiroshi Fujita, Teruhiko Toyama, Yukio Kiyohisa, Takeo Yoshimoto, and Tetsuo Yanami, Ohmuta-shi, Japan, assignors to Mitsui Kagaku Kogyo Kabushiki Kaisha, Tokyo, Japan, a corporation of Japan
No Drawing. Filed Mar. 28, 1967, Ser. No. 626,422
Claims priority, application Japan, Mar. 30, 1966, 41/19,514
Int. Cl. A01n *9/20, 7/00;* C07c *43/20*
U.S. Cl. 71—124     2 Claims

ABSTRACT OF THE DISCLOSURE

A herbicidal composition containing as an active ingredient at least one compound represented by the formula

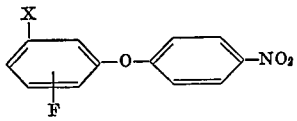

wherein X is a member selected from the group consisting of chlorine and bromine and a method for inhibiting growth of weeds and grasses by using the above composition.

---

This invention relates to herbicidal compositions containing as an active ingredient at least one compound selected from 3-chloro-fluoro-4'-nitrodiphenyl ethers and 3-bromo-fluoro-4'-nitrodiphenyl ethers represented by the general formula:

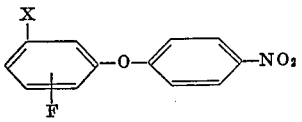

(wherein X is a chloine atom or bromine atom)

and a method of inhibiting the growth of weeds and grasses with the use of said compositions.

It has been hitherto known that among dihalogeno-4'-nitrodiphenyl ethers, only those compounds in which a halogen atom is attached to the 2- and 4-positions of the phenyl ring having no nitro group have a herbicidal activity, and those compounds having a halogen atom at other positions have no or little herbicidal activity. For instance, according to the specification of Japanese Patent No. 411,235, the compounds having a chlorine or bromine atom at the 2- and 4-positions of the phenyl ring having no nitro group have a herbicidal activity, but the compounds having a chlorine atom at the 2- and 3-positions, 2- and 5-positions, or 3- and 5-positions are poor in herbicidal activity. The inventors for this application, too, have confirmed that the compounds having a chlorine atom at the 2- and 6-positions are also poor in herbicidal activity.

Herbicides containing as an effective component a dihalogeno 4'-nitrodiphenyl ether having a halogen atom at the 2- and 4-positions of the phenyl group having no nitro group have been practically used in amounts of 20 to 40 g., calculated as effective ingredient, per are. Since herbicides are low in herbicidal effect against grown weeds if used in such amounts, the suitable period of application is short. In addition, these herbicides are disadvantageously low in herbicidal activity against broad-leafed weeds such as pickerel weed. For these reasons, they cannot be herbicides effectively used in practice.

Accordingly, an object of this invention is to provide herbicides free from the above-mentioned defects, and a herbicidal method of using such herbicides.

We have synthesized many dihalogeno-4'-nitrodiphenyl ethers having a halogen atom at positions other than 2- and 4-positions of the phenyl group having no nitro group, and estimated their herbicidal activity. Consequently, we have found that the compounds represented by the foregoing formula having a chlorine or bromine atom at the 3-position and a fluorine atom at another position, namely 3 - chloro(or bromo) - fluoro - 4' - nitrodiphenyl ethers, have an excellent herbicidal activity. Further detailed tests in herbicidal activity of these ethers have revealed that the compounds of this group have the following merits as compared with the known herbicidally active compounds, namely 2,4-dihalogeno-4'-nitrodiphenyl ethers.

(1) 3-chloro(bromo)-fluoro-4'-nitrodiphenyl ethers exhibit a herbicidal activity against a wide range of plants in extremely small amounts. As compared with the said known compounds, they have a herbicidal ability 2 to 5 times as much towards the plants of the grass family, and 5 to 10 times as much against broad-leafed plants. They give sufficient herbicidal effect in practice even when used in amounts per are calculated as the effective ingredient of 5 to 10 g. for rice paddy field and 10 to 20 g. for an ordinary farming field.

(2) 3-chloro(bromo)-fluoro-4'-nitrodiphenyl ethers have a strong herbicidal action even against grown weeds, so that the suitable period of application is long and they are advantageous for use in agriculture.

These merits will be substantiated by the following test examples.

The effective ingredients of the herbicidal composition of this invention are as follows:

3-chloro-2-fluoro-4'-nitrodiphenyl ether,
3-chloro-4-fluoro-4'-nitrodiphenyl ether,
3-chloro-5-fluoro-4'-nitrodiphenyl ether,
3-chloro-6-fluoro-4'-nitrodiphenyl ether,
3-bromo-2-fluoro-4'-nitrodiphenyl ether,
3-bromo-4-fluoro-4'-nitrodiphenyl ether,
3-bromo-5-fluoro-4'-nitrodiphenyl ether, and
3-bromo-6-fluoro-4'-nitrodiphenyl ether.

These compounds can be relatively easily synthesized at high yield according to the known customary manner by condensing an alkali salt of 3-chloro(or bromo)-fluorophenol with para-nitrohalogenobenzene in a solvent or in the absence of a solvent. The examples of the synthesis are shown below.

EXAMPLE OF SYNTHESIS (1)

Synthesis of 3-chloro-4-fluoro-4'-nitrodiphenyl ether 18.5 grams (0.1 mole) of a potassium salt of 3-chloro-4-fluorophenol and 15.5 g. (0.11 mole) of p-fluoronitrobenzene were mixed with each other and put into 30 g. of dimethyl sulphoxide. They were reacted with each other by heating at 150° C. for 6 hours while agitating. Potassium fluoride formed as by-product was removed from the reaction product by filtration, and the dimethyl sulphoxide and the unreacted p-fluoronitrobenzene were recovered by distillation under reduced pressure. Then, a fraction at 198 to 200° C. at 8 mm. Hg was recovered, and 25 g. of light yellowish white 3-chloro-4-fluoro-4'-nitrodiphenyl ether having a melting point of 85 to 86° C. were obtained. The elemental analysis of this product gave the following results. Calculated (percent): C, 53.85; H, 2.64; Cl, 13.25; Fl, 7.10; N, 5.23. Found (percent): C, 53.96; H, 2.88; Cl, 12.99; Fl, 5.43; N, 5.45.

The yield based on the potassium salt of 3-chloro-4-fluorophenol was 93.2%.

EXAMPLE OF SYNTHESIS (2)

Synthesis of 3-chloro-6-fluoro-4'-nitrodiphenyl ether 31.4 grams (0.17 mole) of a potassium salt of 3-chloro-6-fluorophenol and 26.0 g. (0.184 mole) of p-fluoronitrobenzene were mixed with each other, and put into 80 g. of dimethyl sulphoxide. They were reacted with each other by heating to 147° C. for 6 hours while agitating. Potassium fluoride formed as by-product was removed by filtration, and the dimethyl sulphoxide and the unreacted p-fluoronitrobenzene were recovered by distillation under reduced pressure, whereby 44.5 g. of a crude 3-chloro-6-fluoro-4'-nitrodiphenyl ether having a melting point of 66.5 to 74.2° C. were obtained. This crude product was recrystallized from methanol, and 42.2 g. of light yellowish white crystals were obtained, having a melting point of 72.2 to 74.8° C. The product revealed the following elemental analysis values. Calculated (percent): C, 53.85; H, 2.64; Cl, 13.25; Fl, 7.10; N, 5.23. Found (percent): C, 54.13; H, 2.82; Cl, 14.10; Fl, 5.03; N, 5.20.

The yield based on 3-chloro-6-fluorophenol potassium salt was 92.5%.

EXAMPLE OF SYNTHESIS (3)

Synthesis of 3-bromo-4-fluoro-4'-nitrodiphenyl ether 22.9 grams (0.1 mole) of a potassium salt of 3-bromo-4-fluorophenol and 15.5 g. (0.11 mole) of p-fluoronitrobenzene were mixed with each other, and put into 40 g. of dimethyl sulphoxide. They were reacted with each other by heating at 130° C. for 6 hours while agitating. The same treatment as in Example of Synthesis (2) of the reaction product gave 31.1 g. of a crude 3-bromo-4-fluoro-4'-nitrodiphenyl ether having a melting point of 85.5 to 93° C. This crude product was recrystallized from ethanol, and 27 g. of light yellowish white crystals were obtained, having a melting point of 91.8 to 93.2° C. The product revealed the following elemental analysis values. Calculated (percent): C, 46.18; H, 2.26; Br, 25.61; Fl, 6.09; N, 4.49. Found (percent): C, 47.76; H, 2.40; Br, 25.69; Fl, 5.78; N, 4.47.

The yield based on the potassium salt of 3-bromo-4-fluorophenol was 86.5%.

Herbicidal compositions of the desired form such as dust, granule, wettable powder, emulsion and liquid can be obtained according to the customary method by blending at least one of the compounds of the present invention represented by the foregoing general formula with various adjuvants, for instance, solid carriers such as bentonite, clay, talc and kaolin, liquid carriers such as xylene, petroleum and alcohol, and if desired, anionic, cationic and non-ionic surface active agents. The suitable amount of the compounds contained in the composition is 1 to 10% by weight for dust and granule, and 10 to 50% by weight for wettable powder, emulsion and liquid.

The addition to the composition of this invention of other various herbicidal compounds as effective ingredients serves to increase the practical value of the composition as a herbicide. Particularly, when it is intended to continue the herbicidal effect for a long time, the addition of herbicidal compounds having high after-effect such as urea or triazine type herbicidal compounds is of advantage. It is possible, too, to incorporate into the herbicidal composition of this invention other agricultural chemicals such as an insecticide, acaricide and fungicide or such fertilizer component such as urea and complex fertilizers. Compositions in which such insecticides as gamma benzene hexachloride ($\gamma$-BHC), 1-naphthyl-N-methylcarbamate (NAC), O,O-diethyl-O-(2-isopropyl-6-methyl - 4 - pyrimidyl)phosphorothioate (Diazinon) are incorporated particularly contribute greatly to the saving of agricultural labor because both the weeds and obnoxious insects can be eradicated at the same time.

With a view to describing this invention specifically, some of the examples of preparation and testing of the composition of this invention will be given. In each of the examples, parts are by weight unless otherwise stated.

EXAMPLE OF PREPARATION 1 (GRANULE)

The following components were mixed and pulverized:

| | Parts |
|---|---|
| 3-chloro-4-fluoro-4'-nitrodiphenyl ether | 2 |
| Sodium ligninsulphonate | 2 |
| Bentonite | 60 |
| Talc | 36 |

With the addition of a suitable amount of water, the pulverized mixture was extruded through a nozzle with a diameter of 0.7 mm., dried, and granulated by milling.

The obtained composition is suitable as a herbicide for application to the rice paddy field.

EXAMPLE OF PREPARATION 2 (WETTABLE POWDER)

The following components were mixed and pulverized to make a wettable powder:

| | Parts |
|---|---|
| 3-chloro-6-fluoro-4'-nitrodiphenyl ether | 30 |
| 2-chloro-4,6-bis(ethylamino)-1,3,5-triazine | 20 |
| Sodium alklybenzenesulphonate | 10 |
| Clay | 40 |

This composition is suitable as a herbicide for application to the ordinary farming field.

EXAMPLE OF PREPARATION 3 (EMULSION)

The following components were mixed and dissolved to make an emulsion:

| | Parts |
|---|---|
| 3-bromo-4-fluoro-4'-nitrodiphenyl ether | 20 |
| 3-bromo-6-fluoro-4'-nitrodiphenyl ether | 10 |
| Xylene | 60 |
| Sorpol 800 (emulsifier manufactured by Toho Kagaku, Japan) | 10 |

This composition is suitable as a herbicide for application after seeding of rice plants in a direct-sown rice culture in a paddy field.

EXAMPLE OF PREPARATION 4 (INSECTICIDAL AND HERBICIDAL COMPOSITION)

The following components were mixed and pulverized:

| | Parts |
|---|---|
| 3-chloro-2-fluoro-4'-nitrodiphenyl ether | 1.5 |
| 2,6-dichlorobenzonitrile | 1.5 |
| 15% $\gamma$-BHC | 40 |
| Calcium ligninsulphonate | 7 |
| Bentonite | 50 |

With the addition of a small amount of water, the pulverized mixture was subjected to rolls and made into flakes. They were dried and granulated by milling.

This resulting composition is suitable as an insecticidal and herbicidal agent for application after intermediate cultivation of rice paddy field.

EXAMPLE OF PREPARATION 5 (HERBICIDAL FERTILIZER)

One part of 3-bromo-5-fluoro-4'-nitrodiphenyl ether was incorporated into 100 parts of a complex fertilizer. The composition obtained is very effective for application to a rice paddy field before or after the transplantation of rice paddy seedlings.

EXAMPLE OF TESTING 1 (TEST IN HERBICIDAL ACTIVITY)

Tests were made as to the herbicidal activity of various dihalogeno-4'-nitrodiphenyl ethers against barn yard grasses and rapes.

Each of the compounds was blended with a surfactant and clay to make wettable powder. By dilution of it with water, suspensions of various concentrations indicated in Table 1 below were prepared. Three millilitres of each of the suspensions were poured into a petri dish with a diameter of 9 cm. in which a filter paper was placed. Each 25 seeds of barnyard grass and rape were placed on the filter paper, and were contacted with the suspension for 10 days while the temperature was maintained at 28° C. At the end of this period, the degree of inhibition of the growth of barnyard grass and rape was examined, and the results are shown in Table 1. In Table 1, the degree of inhibition is shown in 6 grades in which 0 represents the growth to the same extent as that in the control plot (water), and 5 shows almost a complete withering. A greater number, therefore, shows a higher activity of the herbicidal composition. In this test, the barnyard grass and rape were chosen as the representative of the weed of grass family and broad-leafed plants, respectively. It is clear from Table 1 that the effective ingredients of the present invention have an extremely high activity against both of these kinds of plants.

TABLE 1

| | Degree of inhibition of growth at various concentrations | | | | | | | |
|---|---|---|---|---|---|---|---|---|
| | Barnyard grass | | | | Rape | | | |
| Compounds as effective ingredients | p.p.m. 100 | p.p.m. 30 | p.p.m. 10 | p.p.m. 3 | p.p.m. 100 | p.p.m. 30 | p.p.m. 10 | p.p.m. 3 |
| (1) F–[C₆H₃(Cl)]–O–[C₆H₄]–NO₂ (Cl at top) | 5 | 5 | 5 | 4 | 5 | 5 | 5 | 3 |
| (2) F–[C₆H₃(Br)]–O–[C₆H₄]–NO₂ (Br at top) | 5 | 5 | 4 | 3 | 5 | 5 | 5 | 2 |
| (3) [C₆H₃(Cl top, F bottom)]–O–[C₆H₄]–NO₂ | 5 | 5 | 4 | 1 | 5 | 5 | 5 | 1 |
| (4) [C₆H₃(Br top, F bottom)]–O–[C₆H₄]–NO₂ | 5 | 5 | 3 | 1 | 5 | 5 | 3 | 1 |
| (5) Cl–[C₆H₃(F)]–O–[C₆H₄]–NO₂ | 0 | 0 | 0 | 0 | 2 | 0 | 0 | 0 |
| (6) Cl–[C₆H₃(Cl)]–O–[C₆H₄]–NO₂ | 0 | 0 | 0 | 0 | 0 | 0 | 0 | 0 |
| (7) [C₆H₃(F top, Br bottom)]–O–[C₆H₄]–NO₂ | 0 | 0 | 0 | 0 | 0 | 0 | 0 | 0 |
| (8) [C₆H₃(Br top, Br bottom)]–O–[C₆H₄]–NO₂ | 0 | 0 | 0 | 0 | 0 | 0 | 0 | 0 |
| (9) F–[C₆H₃(F)]–O–[C₆H₄]–NO₂ | 5 | 0 | 0 | 0 | 5 | 0 | 0 | 0 |
| (10) Cl–[C₆H₃(Cl)]–O–[C₆H₄]–NO₂ | 5 | 4 | 1 | 1 | 4 | 2 | 1 | 0 |
| (11) Br–[C₆H₃(Br)]–O–[C₆H₄]–NO₂ | 4 | 4 | 0 | 0 | 4 | 2 | 0 | 0 |

Note.—Compounds (1) to (4) are the compounds of this invention, and compounds (5) to (11) are contrasts. This is the same with respect to Tables 2 and 3.

EXAMPLE OF TESTING 2 (HERBICIDAL TEST IN RICE PADDY FIELD)

The following test was conducted with respect to a pot are and gives some phytotoxicity to the paddy rice. It is clear from the results shown in Table 2 that the herbicidal compositions of this invention are markedly excellent.

TABLE 2

| Compounds as effective ingredient (2% granule) | Amount of effective ingredient applied (g./are) | Weed remaining ratio (to untreated plot by percent) | | | | Phytotoxicity [1] | |
|---|---|---|---|---|---|---|---|
| | | Applied 5 days later | | Applied 10 days later | | Applied 5 days later | Applied 10 days later |
| | | Weeds of grass family | Broad-leafed plants | Weeds of grass family | Broad-leafed plants | | |
| (1) | 20.0 | 0 | 0 | 0 | 0 | ± | — |
| (1) | 10.0 | 0 | 0 | 0 | 0 | — | — |
| (1) | 5.0 | 0 | 0 | 12.8 | 0 | — | — |
| (1) | 2.5 | 20.4 | 11.6 | | | — | — |
| (3) | 20.0 | 0 | 0 | 0 | 0 | ± | — |
| (3) | 10.0 | 0 | 0 | 7.9 | 7.6 | — | — |
| (3) | 5.0 | 0.5 | 0 | 23.6 | 17.3 | — | — |
| (3) | 2.5 | 68.8 | 23.3 | | | — | — |
| (2) | 20.0 | 0 | 0 | 0 | 0 | ± | — |
| (2) | 10.0 | 0 | 0 | 8.8 | 1.1 | — | — |
| (2) | 5.0 | 0.4 | 0 | 30.5 | 2.2 | — | — |
| (2) | 2.5 | 23.8 | 18.6 | | | — | — |
| (4) | 20.0 | 0 | 0 | 0 | 0 | — | — |
| (4) | 10.0 | 3.8 | 0 | 11.7 | 3.8 | — | — |
| (4) | 5.0 | 20.9 | 2.2 | 57.7 | 20.9 | — | — |
| (4) | 2.5 | 59.7 | 33.3 | | | — | — |
| (10) [2] | 30.0 | 0 | 0 | 23.5 | 36.3 | + | ± |
| (10) [2] | 20.0 | 3.8 | 11.8 | 62.7 | 70.6 | ± | — |
| (10) [2] | 10.0 | 20.9 | 26.6 | | | — | — |
| (10) [2] | 5.0 | 59.7 | 53.7 | | | — | — |

[1] Phytotoxicity: +=slight; ±=very slight; —=none.
[2] Commercially available 7% granular compositions.

of 1/5000 are with a view to getting information about the herbicidal effect and phytotoxicity in a rice paddy field.

The pot was charged with the soil from the aquatic rice paddy field containing seeds of weeds, and filled with water. Seedlings of rice paddy (Ariake variety) were transplanted thereinto, and 5 days and 10 days later, each of the 2% granular composition prepared according to the said Example of Preparation 1 by using the compounds (1) to (4) indicated in Table 1 was applied thereto in the amounts indicated in Table 2. The depth of water was maintained at 2 to 3 cm., and after the lapse of 20 days, the amount of remaining weeds was examined together with the observation of the degree of the phytotoxicity of the composition against the rice paddy. The results are shown in Table 2.

The weed remaining ratio mentioned in Table 2 is a ratio of the amount of remaining weeds in the untreated plot to that in the test plot in terms of percentage. A smaller numerical value shows a higher herbicidal activity.

The herbicidal composition of this invention, when applied 5 days after the transplantation, is effective against the weeds in an amount, calculated as effective ingredient, of 2.5 to 5.0 g. per are, and when applied 10 days after the transplantation, is effective in an amount, calculated as effective ingredient, of 5.0 to 10.0 g. per are, and does not give phytotoxicity to rice paddy. On the other hand, the contrast herbicidal composition (commercially available 7% granular composition) containing as effective ingredient 2,4-dichloro-4'-nitrodiphenyl ether, when applied 5 days later, must be in an amount of 20.0 g. per are calculated as effective ingredient, and when applied 10 days later, has insufficient herbicidal effect even if used in an amount calculated as effective ingredient of 30.0 g. per

EXAMPLE OF TESTING 3 (HERBICIDAL TEST IN ORDINARY FARMING FIELD)

The field was divided into 36 plots each having an area of 1 m. square. The seeds of onion, carrot, tomato, cucumber, radish, and pea were each sown in 6 plots, and covered with soils. Each of 10% emulsions prepared according to the said Example of Preparation 3 by using the compounds (1) and (2) mentioned in Table 1 was diluted with water to 50 and 100 times its volume, 50 cubic centimeters of each of these emulsions were sprayed onto the half of each plot (in an amount calculated as effective ingredient of 20.0 g. and 10.0 g. per are), and the remaining half was used as an untreated control plot. For contrast, a commercially available emulsion containing 25% of 2,4-dichloro-4'-nitrodiphenyl ether (compound (10) in Table 1) as an effective ingredient was diluted with water to 62.5 and 125 times its volume, and sprayed in the same manner (in an amount calculated as effective ingredient of 40.0 g. and 20.0 g. per are). Two months later, the amount of the weeds in the treated plots was compared with that in the untreated plots. Also, the phytotoxicity against each crop was examined. The results are shown in Table 3.

It was found that the two compositions of this invention exhibit an excellent herbicidal effect by application in an amount calculated as effective ingredient of 10.0 g. to 20.0 g. per are, and have hardly any phytotoxicity against the crops other than cucumber, and that the compositions are suitable as herbicides for an ordinary farming field.

On the other hand, the contrast herbicidal composition is insufficiently effective by application in an amount of 20.0 g. per are calculated as effective ingredient, and must be applied in an amount of 40.0 g. per are. The contrast composition gave remarkable phytotoxicity to onion, tomato and cucumber.

TABLE 3

| Compounds as effective ingredient | Compositions of this invention | | | | Contrast | |
|---|---|---|---|---|---|---|
| | (1) | | (2) | | (10) | |
| Form of composition | 10% emulsion | | 10% emulsion | | Commercial available 25% emulsion | |
| Amount of effective ingredient sprayed (g./are) | 10.0 | 20.0 | 10.0 | 20.0 | 20.0 | 40.0 |
| Herbicidal effect weed remaining ratio (to the untreated plot, percent) | 24.0 | 13.9 | 17.5 | 13.5 | 44.5 | 22.7 |
| Phytotoxicity: [1] | | | | | | |
| Onion | — | + | — | + | ++ | +++ |
| Carrot | — | — | — | — | — | — |
| Tomato | — | ± | — | — | ++ | +++ |
| Cucumber | + | ++ | +++ | +++ | +++ | +++ |
| Radish | — | ± | — | — | — | — |
| Pea | — | — | — | — | — | — |

[1] Phytotoxicity: —=none; ±=very slight; +=slight; ++=considerable; +++=enormous.

What is claimed is:
1. A herbicidal composition consisting essentially of an inert carrier and, as an active ingredient, in a herbicidally effective amount, at least one compound selected from the formulae:

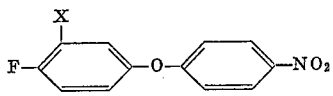

and

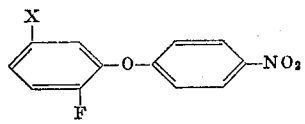

wherein X is a member selected from the group consisting of chlorine and bromine.

2. A method for inhibiting growth of barnyard grass and rape which comprises applying to the locus to be protected from said weeds, in an amount sufficient to exert herbicidal action thereon and at a rate from about 2 to about 20 grams per are, at least one compound selected from the formulae:

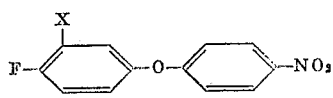

and wherein X is a member selected from the group consisting of chlorine and bromine.

References Cited

UNITED STATES PATENTS

| | | | |
|---|---|---|---|
| 3,080,225 | 3/1963 | Wilson et al. | 71—124 |
| 3,131,166 | 4/1964 | Harris et al. | 71—76 |
| 3,154,398 | 10/1964 | McRae | 71—118 |
| 3,223,516 | 12/1965 | Gilbert et al. | 71—122 |

FOREIGN PATENTS 1,476,163    2/1967    France.

LEWIS GOTTS, *Primary Examiner.*

G. HOLLRAH, *Assistant Examiner.*

U.S. Cl. X.R.

260—612